United States Patent [19]
Gleason et al.

[11] Patent Number: 5,744,229
[45] Date of Patent: Apr. 28, 1998

[54] GLASS FIBER MAT MADE WITH POLYMER-REACTED ASPHALT BINDER

[75] Inventors: James R. Gleason; Donn R. Vermilion, both of Newark, Ohio

[73] Assignee: Owens-Corning Fiberglas Technology Inc., Summit, Ill.

[21] Appl. No.: 519,957

[22] Filed: Aug. 28, 1995

[51] Int. Cl.$^6$ .............................. B32B 11/02; B32B 17/04
[52] U.S. Cl. .................. 428/297.4; 524/505; 524/510
[58] Field of Search ...................... 428/291, 417, 428/524, 297.4; 524/505, 510

[56] References Cited

U.S. PATENT DOCUMENTS

| | | | |
|---|---|---|---|
| 2,676,155 | 4/1954 | Farris . | |
| 2,701,777 | 2/1955 | Farris . | |
| 4,246,314 | 1/1981 | Marzocchi et al. | 428/378 |
| 4,255,485 | 3/1981 | Yau | 524/52 |
| 4,275,685 | 6/1981 | Marzocchi et al. | 428/392 |
| 4,301,051 | 11/1981 | Marzocchi et al. | 428/394 |
| 4,333,866 | 6/1982 | Uffner | 524/534 |
| 4,381,200 | 4/1983 | Bolen et al. | 106/282 |
| 4,419,489 | 12/1983 | Grossi et al. | 525/54.5 |
| 4,468,430 | 8/1984 | Ruede | 428/291 |
| 4,485,144 | 11/1984 | Uffner et al. | 428/343 |
| 4,518,741 | 5/1985 | Uffner et al. | 525/54.5 |
| 4,569,968 | 2/1986 | Uffner et al. | 525/54.5 |
| 4,683,165 | 7/1987 | Lindemann et al. | 428/290 |
| 4,917,764 | 4/1990 | Lalwani et al. | 428/291 |
| 5,435,842 | 7/1995 | Mukaida et al. | 524/442 |
| 5,445,878 | 8/1995 | Mirous et al. | 428/291 |
| 5,462,588 | 10/1995 | Walters et al. | 106/18.21 |
| 5,494,728 | 2/1996 | Vermillion et al. | 428/291 |
| 5,576,363 | 11/1996 | Gallagher et al. | 524/59 |

*Primary Examiner*—Robert E. Sellers
*Attorney, Agent, or Firm*—C. Michael Gegenheimer; Ted C. Gillespie

[57] ABSTRACT

A glass fiber mat contains between 68% and 90% glass fibers and between 10% and 32% binder by weight of the mat. The binder contains between 2% and 90% polymer modified asphalt and between 10% and 98% thermosetting resin by weight of the binder. The polymer which modifies the asphalt is selected from thermoplastic and/or thermoset polymers. A preferred thermoplastic polymer is selected from reactive thermoplastic polymers and/or thermoplastic elastomers. The binder is preferably applied to the glass fibers in the form of a blend of thermosetting resin and an aqueous emulsion of polymer modified asphalt. The aqueous emulsion is prepared by combining between 5% and 75% asphalt, between 2% and 20% polymer selected from thermoplastic and/or thermoset polymers, between 25% and 95% water, and between 0.5% and 5% surfactant by weight of the aqueous emulsion.

19 Claims, No Drawings

GLASS FIBER MAT MADE WITH POLYMER-REACTED ASPHALT BINDER

TECHNICAL FIELD

This invention relates in general to glass fiber mats, and in particular to glass fiber mats having improved compatibility and performance in asphaltic composites such as roofing shingles.

BACKGROUND ART

Asphalt roofing shingles are based on an interior web or carrier of a wet process glass fiber mat. Shingle manufacturing consists of running a continuous wet process glass fiber mat in a bath of molten asphalt to cause a coating on both sides of the mat as well as filling in the interstices between the individual glass fibers.

Wet process glass fiber mats are conventionally made from glass fibers held together by a binder comprising a thermoplastic and thermoset polymer system. Unfortunately, such conventional binders are not always compatible with the asphalt used to coat the mats in asphaltic composites such as roofing shingles. This can cause processing difficulties, and can result in roofing shingles having poor tear strength and a loose coating. Further, the conventional polymer binders can significantly increase the cost of the roofing shingles.

Thus, it would be desirable to improve the compatibility of glass fiber mats to asphaltic composites such as shingles, lower costs relative to the current compositions, and improve product performance in the areas of processing and tear strength.

DISCLOSURE OF INVENTION

This invention relates to a glass fiber mat comprising between about 68% and about 90% by weight of glass fibers and between about 10% and about 32% by weight of binder. The binder contains between about 2% and about 90% by weight of polymer modified asphalt and between about 10% and about 98% by weight of a thermosetting resin. The polymer which modifies the asphalt is selected from thermoplastic and/or thermoset polymers. A preferred thermoplastic polymer is selected from reactive thermoplastic polymers and/or thermoplastic elastomers.

The binder is preferably applied to the glass fibers in the form of a blend of thermosetting resin and an aqueous emulsion of polymer modified asphalt. The aqueous emulsion is prepared by combining between about 5% and about 75% asphalt, between about 2% and about 20% polymer selected from thermoplastic and/or thermoset polymers, between about 25% and about 95% water, and between about 0.5% and about 5% surfactant by weight of the aqueous emulsion.

The glass fiber mat of this invention has improved compatibility to asphaltic composites such as shingles, lower costs relative to the current formulations, and improved product performance in the areas of processing and tear strength.

Various objects and advantages of this invention will become apparent to those skilled in the art from the following detailed description of the preferred embodiment.

BEST MODE FOR CARRYING OUT THE INVENTION

The glass fiber mat of this invention comprises between about 68% and about 90% glass fibers and between about 10% and about 32% binder, by weight of the mat. Preferably the glass fiber mat comprises between about 73% and about 85% glass fibers and between about 15% and about 27% binder. These weight percentages are based on the weight of the glass fiber mat after it has been dried and is ready for use. LOI ("Loss On Ignition") is used to measure the weight percent of binder in the glass fiber mat. It is determined by burning off all the binder from the glass fibers and then measuring the weight loss. LOI is calculated as [(Initial Weight–Final Weight)/Initial Weight].

Any conventional process can be used to make the glass fibers. One such process is known as the rotary process, in which molten glass is placed into a rotating spinner which has orifices in the perimeter, and glass flows out the orifices to produce a downwardly falling stream of fibers which are collected on a conveyor. A preferred fiber forming process is a continuous process in which glass fibers are mechanically pulled from the orificed bottom wall of a feeder or bushing containing molten glass.

Substantially contemporaneous with forming, the glass fibers are brought into contact with an applicator wherein a size is applied to the fibers. The sized glass fibers are then chopped to a specified length and packaged. Glass fibers made by these processes are commercially available from Owens-Corning Fiberglas Corporation, Toledo, Ohio.

The glass fibers preferably have an average length between about 3 mm and about 130 mm, more preferably between about 3 mm and about 25 mm. They preferably have an average diameter between about 7 microns and about 25 microns, more preferably between about 8 microns and about 20 microns.

The binder for the glass fibers comprises between about 2% and about 90% polymer modified asphalt and between about 10% and about 98% thermosetting resin, by weight of the binder. Preferably the binder comprises between about 5% and about 50% by weight of polymer modified asphalt and between about 50% and about 95% by weight of a thermosetting resin, and more preferably between about 5% and about 25% by weight of polymer modified asphalt and between about 75% and about 95% by weight of a thermosetting resin. The weight ratio of asphalt to polymer in the polymer modified asphalt is preferably between about 3:1 and about 20:1. These weight percentages and ratios are based on the weight of the binder in the glass fiber mat after it has been dried and is ready for use.

The binder is preferably applied to the glass fibers in the form of a blend of thermosetting resin and an aqueous emulsion of polymer modified asphalt. The aqueous emulsion is prepared by combining between about 5% and about 75% asphalt, between about 2% and about 20% polymer selected from thermoplastic and/or thermoset polymers, between about 25% and about 95% water, and between about 0.5% and about 5% surfactant, by weight of the aqueous emulsion. The asphalt and polymer are first blended and react to form the polymer modified asphalt, and then the polymer modified asphalt is blended with the water and surfactant to form the aqueous emulsion.

The type of asphalt used in the aqueous emulsion is not critical. The asphalt can be any bituminous material such as tars, pitches or asphalts. The asphalt can be any natural or petroleum derived asphalt. The common source of asphalt is the residue or bottoms from the petroleum refining industry. AC grades of asphalt are preferred because they are soft and easily emulsified, and thus easy to process. Suitable grades can vary between AC-2.5 and AC-30, and AC-10 is most preferred. Preferably the amount of asphalt used to prepare the aqueous emulsion is between about 10% and about 70%, and more preferably between about 50% and about 70%, by weight of the aqueous emulsion.

The polymer which modifies the asphalt in the aqueous emulsion is selected from thermoplastic and/or thermoset polymers. Addition of the polymer enhances the tear strength of the glass fiber mat. As mentioned above, the amount of polymer used to prepare the aqueous emulsion is between about 2% and about 20%, by weight of the aqueous emulsion. Preferably the polymer is a reactive thermoplastic polymer and/or a thermoplastic elastomer.

When the polymer is a reactive thermoplastic polymer, preferably the amount of reactive thermoplastic polymer used to prepare the aqueous emulsion is between about 15% and about 20%, by weight of the aqueous emulsion. The weight ratio of asphalt to reactive thermoplastic polymer in the polymer modified asphalt is preferably between about 3:1 and about 12:1. The term "reactive thermoplastic polymer" means that the thermoplastic polymer has reactive sites which can react with the reactive sites of an asphalt. Preferred reactive thermoplastic polymers are epoxy-functionalized polymers which have reactive sites in the form of epoxy side groups which can react to the functional groups on the asphalt to form covalent bonds characteristic of thermosetting products. Appropriate epoxy-functionalized polymers include reactive copolymers having two or more monomers. Preferably the copolymer contains glycidyl methacrylate or one of various acrylates. More preferably the copolymer contains glycidyl methacrylate in an amount between about 1% and about 20% by weight of the epoxy-functionalized polymer. The glycidyl methacrylate acts to create reactive side groups or functionalities which can graft into reactive sites in the asphalt and cross link to form a three-dimensional network. Examples of epoxy-functionalized polymers with asphalt can be found in U.S. patent application Ser. No. 08/363,154, entitled "Thermosetting Asphalt", filed Dec. 23, 1994, now U.S. Pat. No. 5,576,363, issued Nov. 19, 1996, and hereby incorporated by reference.

The reactive copolymer preferably contains one or more vinyl monomers, examples of which include ethylene, propylene, vinyl acetate, and n-butyl acrylate. A preferred epoxy-functionalized polymer is Elvaloy AM polymer from duPont (Wilmington, Del.), which consists of ethylene, n-butylacrylate, and glycidyl methacrylate in the approximate monomer ratios of 67:28:5, respectively. Another epoxy-functionalized polymer containing glycidyl methacrylate is Igettabond E from Sumitomo Chemical Co., Ltd. (Japan). The epoxy-functionalized polymer is reacted into the asphalt by any suitable means, such as with a mixer. The mixing will be enhanced if the temperature of the asphalt and the polymer are at least 250° F. (121° C.). Mixing should preferably take place for at least 30 minutes.

When the polymer is a thermoplastic elastomer, preferably the amount of thermoplastic elastomer used to prepare the aqueous emulsion is between about 2% and about 10%, and more preferably between about 5% and about 10%, by weight of the aqueous emulsion. The weight ratio of asphalt to thermoplastic elastomer in the polymer modified asphalt is preferably between about 6:1 and about 20:1. If needed, a coreactant such as a vinyl aromatic monomer can be used to react the thermoplastic elastomer with the asphalt. A preferred thermoplastic elastomer is Kraton 1101 from Shell Co., Houston, Tex. This thermoplastic elastomer can be mixed into the asphalt under high shear at 300° F. (149° C.) to 400° F. (204° C.).

An excellent binder for improving the tear strength of the glass fiber mat can be made by using Trugard, manufactured by Owens-Corning Fiberglas Corporation, Toledo, Ohio. This product is an aqueous emulsion of asphalt reacted with a thermoplastic elastomer formed by reaction of SBS thermoplastic rubber and styrene monomer and asphalt. Trugard is described in more detail in U.S. Pat. No. 4,273,685 to Marzocchi et al., issued Jun. 16, 1981, and U.S. Pat. No. 4,333,866 to Uffner, issued Jun. 8, 1982, both incorporated by reference herein.

The aqueous emulsion contains between about 0.5% and about 5% surfactant, and preferably between about 1% and about 3% surfactant, by weight of the aqueous emulsion. The surfactant can be a cationic, anionic or nonionic surfactant. A preferred anionic surfactant is Indulan-SAL, a lignin-derived surfactant, manufactured by Westvaco Chemical Division, Charleston Heights, S.C. A preferred cationic surfactant is Aerosurf AA57 or AA60, containing amine functionalities, manufactured by Witco Corporation, Dublin, Ohio.

The pH of the emulsion can be adjusted to give maximum stability to the emulsion and will vary depending on the surfactant type. Anionics are typically adjusted to a pH greater than 10.5, and cationics are typically adjusted to a pH less than 3.

The aqueous emulsion also contains between about 25% and about 95% water, preferably between about 30% and about 90%, and more preferably between about 30% and about 50%, by weight of the aqueous emulsion.

The aqueous emulsion can be produced by techniques well known in the art, for example by using a colloid mill to emulsify a dispersion of polymer modified asphalt and surfactant in water.

In addition to the polymer modified asphalt, the binder also comprises between about 10% and about 98% thermosetting resin, by weight of the binder. Preferred thermosetting resins include phenol/formaldehyde, resorcinol/formaldehyde, urea/formaldehyde, melamine/formaldehyde, and mixtures thereof. A preferred binder is made by combining the thermosetting resin with a polymer modified asphalt wherein the asphalt is modified by a reactive thermoplastic polymer. As mentioned above, the reactive thermoplastic polymer gives the polymer modified asphalt a thermoset character. This combines with the thermoset character of the thermosetting resin to form a binder which gives excellent tensile strength and tear strength to the glass fiber mat.

Various fillers or additives can be incorporated into the binder of the glass fiber mats. Fillers can include talc, limestone, wollastonite, microspheres, reclaim rubber or other materials. The addition of fillers or additives can also provide the glass fiber mats with additional properties, such as fire retardancy. Other polymer or organic materials, such as recycled SMC, can also be added to the binder.

The glass fiber mats are prepared on an industrial scale using conventional glass fiber mat processing techniques known to persons skilled in the art, or on a smaller scale using conventional handsheet casting techniques.

EXAMPLES

Glass fiber mat samples were prepared using a handsheet casting technique. Binders were applied to the glass fibers to achieve a target range of about 17% to about 21% binder by weight of the glass fiber mat (as measured by LOI). The amount of binder can vary due to different pick-up rates for the different binders. The glass fibers had an average length of 12 mm and an average diameter of 16 microns. The asphalt was an AC-10 grade asphalt. A Control sample (#1)

was prepared using a conventional binder containing SBR polymer and urea/formaldehyde resin, but no asphalt. Sample #2 was prepared using a binder containing polymer modified asphalt (asphalt modified with Elvaloy AM polymer), but no thermosetting resin. Sample #3 was prepared in accordance with this invention using a binder containing both polymer modified asphalt (asphalt modified with Elvaloy AM polymer) and thermosetting resin (urea/formaldehyde resin). Sample #4 was also prepared in accordance with this invention, but varying the amounts of polymer modified asphalt and thermosetting resin compared to Sample #3. Tear strength and tensile strength of the different glass fiber mat samples were measured. The data are shown below in Table 1:

TABLE 1

| Binder | LOI | Tear Strength | Tensile Strength |
|---|---|---|---|
| (#1) Control | 27.5 | 308 g. | 95 g./2" |
| (#2) 92% Asphalt/8% Polymer | 17.7 | 1072 g. | 9.9 g./2" |
| (#3) 46% Asphalt/4% Polymer/ 50% Resin | 20.6 | 600 g. | 50.6 g./2" |
| (#4) 9.2% Asphalt/0.8% Polymer/ 90% Resin | 24.3 | 396 g. | 85.9 g./2" |

Glass fiber mat Sample #3 and Sample #4 in accordance with this invention have significantly improved tear strength compared to the Control sample made with a conventional binder. In addition, Sample #3 and Sample #4 have acceptable tensile strength, comparable with the Control sample. Sample #2 made with a binder not containing thermosetting resin had improved tear strength but unacceptable tensile strength.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

INDUSTRIAL APPLICABILITY

The invention can be useful in manufacturing glass fiber mats for use as the base material in asphalt shingles.

We claim:

1. A glass fiber mat comprising:
   between about 68% and about 90% glass fibers and between about 10% and about 32% binder, by weight of the glass fiber mat,
   wherein the binder comprises between about 2% and about 90% of an aqueous emulsion of polymer modified asphalt produced by the reaction of an asphalt with a polymer and a surfactant and between about 10% and about 98% thermosetting resin selected from the group consisting of phenol/formaldehyde, resorcinol/formaldehyde, urea/formaldehyde, melamine/formaldehyde, and mixtures thereof, by weight of the binder,
   and wherein the polymer which modifies the asphalt is selected from the group consisting of thermoplastic polymers, thermoset polymers, and mixtures thereof.

2. A roofing shingle according to claim 1 wherein the polymer which modifies the asphalt is a reactive thermoplastic polymer.

3. A roofing shingle according to claim 2 wherein the reactive thermoplastic polymer is an epoxy-functionalized polymer.

4. A roofing shingle according to claim 3 wherein the epoxy-functionalized polymer is a copolymer derived from glycidyl methacrylate.

5. A roofing shingle according to claim 4 wherein the copolymer is further copolymerized from at least one vinyl monomer selected from the group consisting of ethylene, propylene, vinyl acetate, and n-butyl acrylate.

6. A roofing shingle according to claim 2 wherein the polymer is a thermoplastic elastomer, and wherein the thermoplastic elastomer is formed by reaction of SBS thermoplastic rubber and styrene monomer.

7. A roofing shingle according to claim 2 wherein the polymer is an SBS thermoplastic rubber.

8. A glass fiber mat comprising:
   between about 68% and about 90% glass fibers and between about 10% and about 32% binder, by weight of the glass fiber mat,
   wherein the binder comprises between about 5% and about 50% of an aqueous emulsion of polymer modified asphalt produced by the reaction of an asphalt with a polymer and between about 50% and about 95% thermosetting resin selected from the group consisting of phenol/formaldehyde, resorcinol/formaldehyde, urea/formaldehyde, melamine/formaldehyde, and mixtures thereof, by weight of the binder,
   wherein the polymer which modifies the asphalt is a reactive thermoplastic polymer,
   wherein the binder is applied to the glass fibers in the form of a blend of thermosetting resin and an aqueous emulsion of polymer modified asphalt,
   and wherein the aqueous emulsion is prepared by combining between about 50% and about 70% asphalt, between about 15% and about 20% reactive thermoplastic polymer, between about 25% and about 95% water, and between about 0.5% and about 5% surfactant, by weight of the aqueous emulsion.

9. A roofing shingle comprising a glass fiber mat according to claim 1 coated with asphalt to form a shingle.

10. A roofing shingle according to claim 9 wherein the polymer which modifies the asphalt is selected from the group consisting of reactive thermoplastic polymers, thermoplastic elastomers, and mixtures thereof.

11. A roofing shingle according to claim 9 wherein the glass fibers have an average length between about 3 mm and about 130 mm and an average diameter between about 7 microns and about 25 microns.

12. A roofing shingle according to claim 9 wherein the binder comprises between about 5% and about 50% polymer modified asphalt and between about 50% and about 95% thermosetting resin, by weight of the binder.

13. A roofing shingle according to claim 12 wherein the weight ratio of asphalt to polymer in the polymer modified asphalt is between about 3:1 and about 20:1.

14. A roofing shingle according to claim 9 wherein the binder is applied to the glass fibers in the form of a blend of thermosetting resin and an aqueous emulsion of polymer modified asphalt,
   and wherein the aqueous emulsion is prepared by combining between about 5% and about 75% asphalt, between about 2% and about 20% polymer selected from the group consisting of thermoplastic polymers and thermoset polymers, and mixtures thereof, between about 25% and about 95% water, and between about 0.5% and about 5% surfactant, by weight of the aqueous emulsion.

15. A roofing shingle according to claim 14 wherein the polymer is selected from the group consisting of reactive thermoplastic polymers, thermoplastic elastomers, and mixtures thereof.

16. A roofing shingle according to claim 15 wherein the polymer is a reactive thermoplastic polymer.

17. A roofing shingle according to claim 16 wherein the amount of reactive thermoplastic polymer used to prepare the aqueous emulsion is between about 15% and about 20%, by weight of the aqueous emulsion.

18. A roofing shingle according to claim 15 wherein the polymer is a thermoplastic elastomer, and wherein the amount of thermoplastic elastomer used to prepare the aqueous emulsion is between about 2% and about 10%, by weight of the aqueous emulsion.

19. A roofing shingle according to claim 14 wherein the amount of asphalt used to prepare the aqueous emulsion is between about 50% and about 70%, by weight of the aqueous emulsion.

* * * * *